Figure 1:
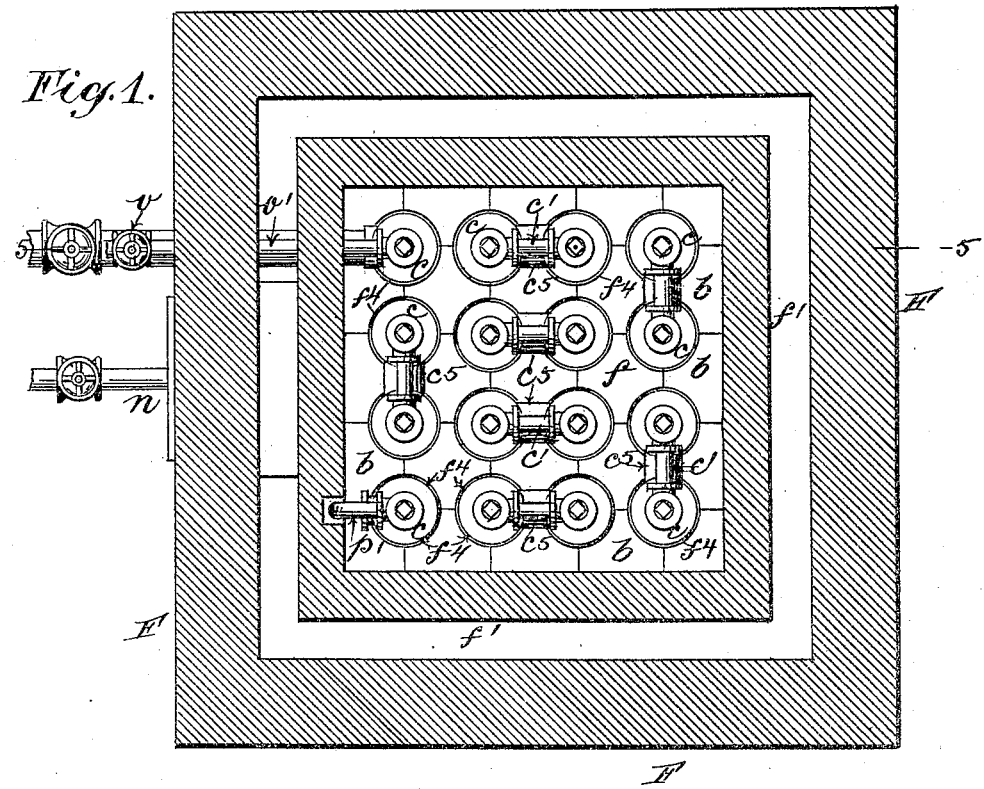

No. 773,258. PATENTED OCT. 25, 1904.
C. R. INGHAM.
STEAM SUPERHEATER.
APPLICATION FILED MAR. 1, 1904.
NO MODEL. 3 SHEETS—SHEET 1.

Witnesses: Inventor:
Charles R. Ingham
By his Attorney
Geo. Wm. Miatt

No. 773,258. PATENTED OCT. 25, 1904.
C. R. INGHAM.
STEAM SUPERHEATER.
APPLICATION FILED MAR. 1, 1904.
NO MODEL. 3 SHEETS—SHEET 2.

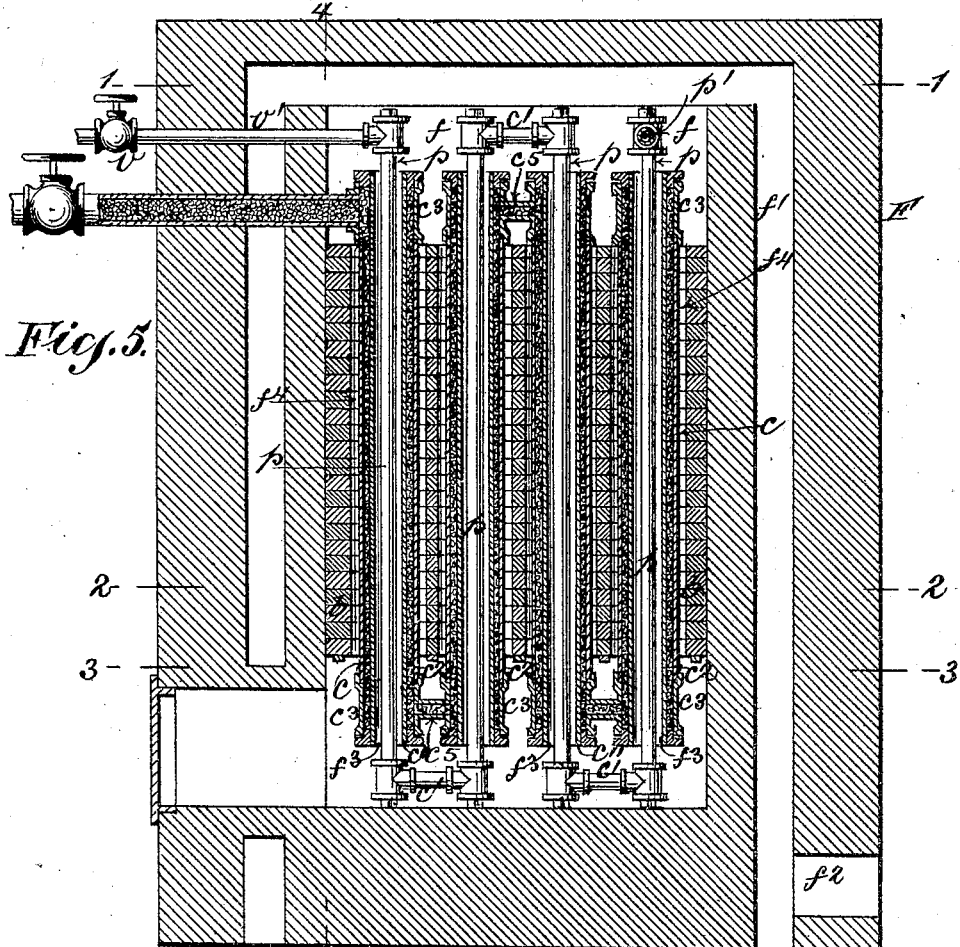

No. 773,258. Patented October 25, 1904.

UNITED STATES PATENT OFFICE.

CHARLES R. INGHAM, OF SUFFERN, NEW YORK.

STEAM-SUPERHEATER.

SPECIFICATION forming part of Letters Patent No. 773,258, dated October 25, 1904.

Application filed March 1, 1904. Serial No. 196,061. (No model.)

*To all whom it may concern:*

Be it known that I, CHARLES R. INGHAM, a citizen of the United States, residing at Suffern, Rockland county, and State of New York, have invented certain new and useful Improvements in Steam-Superheaters, of which the following is a specification sufficient to enable others skilled in the art to which the invention appertains to make and use the same.

My invention relates to superheaters designed to effect the decomposition of steam by wire-drawing it through a long narrow tortuous conduit or retort of very small width in cross-section filled with retarding-surfaces of refractory material, as set forth in my concurrent application, Serial No. 192,546, filed February 8, 1904.

My present invention consists, essentially, in the use, with the retort-pipes of small diameter described in said concurrent application, of concentric annular conduits communicating therewith, also filled with retarding-surfaces of refractory material, the space between the secondary annular conduits and the primary central pipes being utilized as flues for the products of combustion, which also pass around the peripheral sides of said secondary conduits, the object being to first superheat the steam in the tortuous passage of small diameter and then effect the complete decomposition of the steam in the annular conduits, which afford an increased area for expansion without any increase transversely of width of passage—that is to say, the component gases are confined in the secondary conduit between annular walls the inner opposed surfaces of which are a distance apart equal approximately to the diameter of the primary conduit, so that while the area of the secondary conduit as a whole is much greater than that of the primary conduit, still the same conditions as to heating-surface are maintained, since the width transversely of the secondary conduit is substantially the same as that of the primary conduit, and a like degree of heat is maintained uniformly in both, the secondary conduit being exposed to the products of combustion on both sides and the heat penetrating to a uniform degree through the refractory material with which the said secondary conduit is filled, so that the refractory material occupying the central portion of the annular passage is as hot as that portion in actual contact with the annular concentric side walls thereof. By providing a greater area in the secondary conduits while maintaining the same degree of uniformly-distributed heat as in the primary coil I provide for the expansion of the superheated steam and its decomposition into its constituent gases within said secondary conduit, the expansion of the superheated steam causing it to absorb and render latent more heat than when confined under greater pressure in the small primary pipes, thereby facilitating the decomposition of the superheated steam into its constituent gases and rendering the latter stable with relation to each other.

Figure 2:
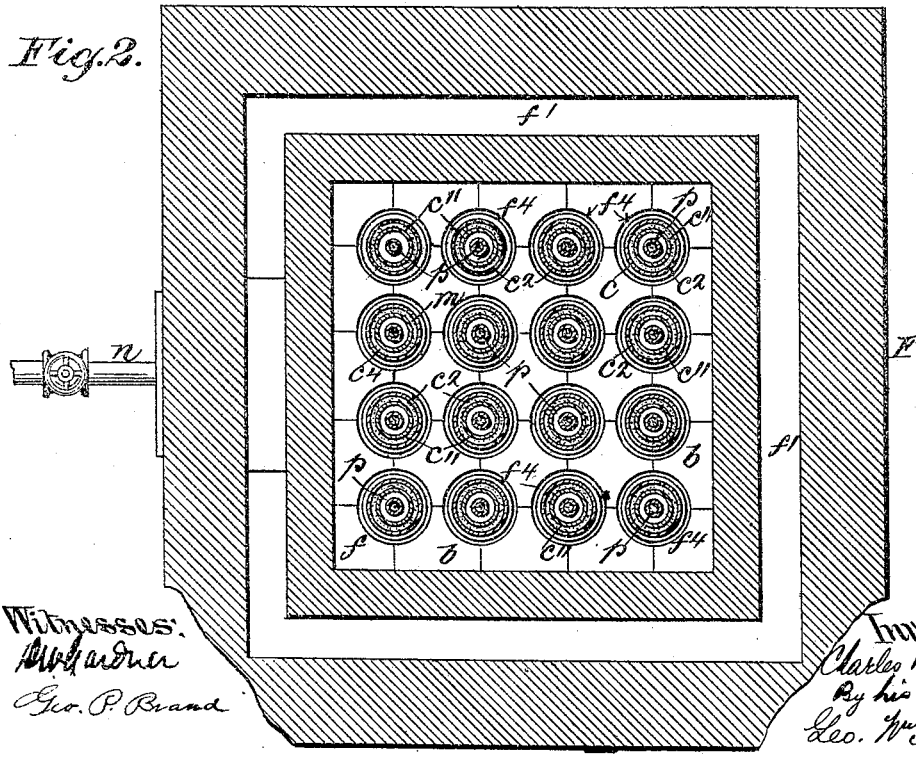
Figure 4:
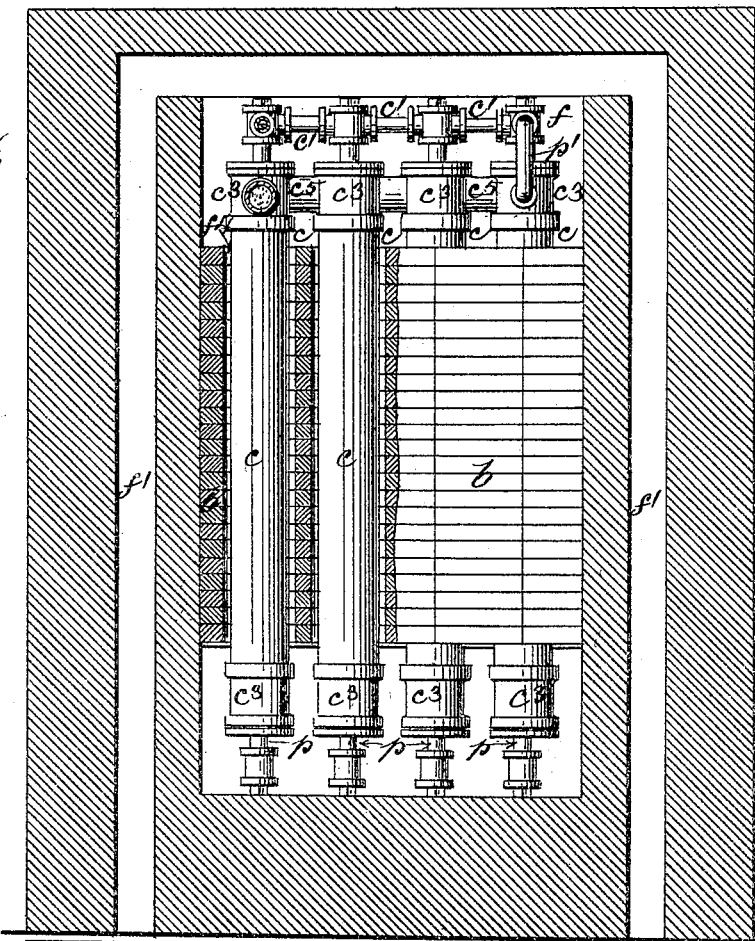
Figure 3:
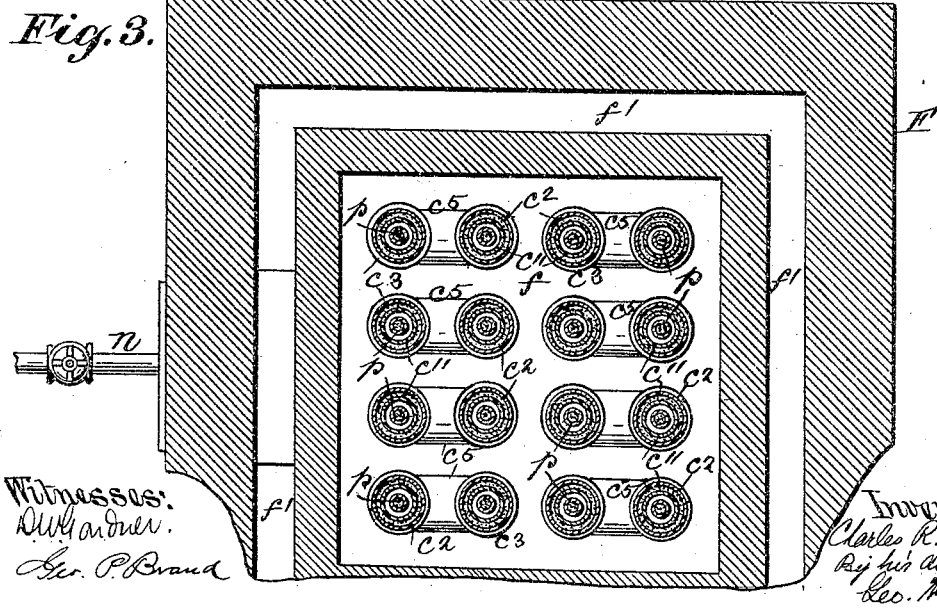

In the accompanying drawings, Figure 1 is a sectional plan taken upon plane of line 1 1, Fig. 5. Fig. 2 is a horizontal section upon plane of line 2 2, Fig. 5; Fig. 3, a horizontal section upon plane of line 3 3, Fig. 5; Fig. 4, a sectional elevation of the interior of the furnace, partly broken away, the walls of the furnace being shown in section on plane of line 4 4, Fig. 5. Fig. 5 is a sectional elevation taken upon plane of line 5 5, Fig. 1. Fig. 6 is a horizontal section, upon an enlarged scale, showing four adjoining members of the retort. Fig. 7 is a sectional view taken upon line 7 7, Fig. 6. Fig. 8 is a transverse section upon plane of line 8 8, Fig. 7.

F is a furnace of any appropriate form and construction, preferably formed with a central combustion-chamber $f$, surrounded by spaces or flues $f'$ $f'$ for the passage of the products of combustion on their way to the discharge-flue $f^2$. The furnace may be heated by liquid or gaseous hydrocarbon introduced through one or more nozzles $n$, and indicated symbolically, or by any other means desired or fuel desired.

$p$ $p$ are pipes forming a series of primary superheaters, preferably not exceeding three inches in internal diameter, connected together successively, filled with fragmentary refractory retarding material $m$, and supplied with steam under pressure through a valve $v$ and pipe $v'$, as in my concurrent application hereinbefore referred to. The discharge-pipe $p'$ at the end of the series of primary superheating-pipes $p$ $p$ opens into the first of a series of annular conduits $c$ $c$, coupled together successively by connections $c'$ $c'$. Each conduit $c$ is preferably, though not necessarily, arranged concentric to one of the primary pipes $p$ and is formed of an inner pipe $c''$ and outer pipe $c^2$, united and centralized by suitable T's or heads $c^3$. The inner pipe $c''$ is of a diameter sufficient to create a flue-space $f^3$ between its inner surface and the opposed peripheral surface of the pipe $p$, and the outer pipe $c^2$ is of a diameter sufficient to create between its inner surface an annular passage-way or space $c^4$ of a width laterally of not more, preferably, than three inches. The T's or heads $c^3$ conform internally as near as possible to these conditions and dimensions, the connections $c^5$ between the heads $c^3$ being preferably flattened or elongated transversely, as indicated in Fig. 8, so that a uniformity of width of passage is maintained practically from one end of a series of conduits $c$ to the other, this width of passage being preferably the same as the internal diameter of the primary heating-pipes $p$, or approximately so.

The spaces $c^4$ in the conduits $c$, as well as the internal spaces in the heads $c^3$ and connections $c^5$, are filled continuously and loosely with fragmentary refractory retarding material $m$ and form, with the interiors of the primary pipes $p$ and connections, one continuous long narrow tortuous passage of uniform width taken transversely. This width of passage is preferably never allowed to exceed three inches, so as to insure the same temperature at the center of the passage as at the sides, as set forth in my concurrent application hereinbefore referred to. In practice I have found an internal width of passage of much less than two inches most effective, while beyond a width of passage of three inches satisfactory and economical results cannot be attained.

In order to insure an intimate contact of the products of combustion with the peripheral surfaces of the conduits $c$ the furnace may be formed with flues $f^4$, surrounding said conduits $c$, as indicated in the drawings, in which $b$ $b$ represent suitably-shaped fire-bricks supported within the combustion-chamber $f$ by suitable means.

The pipes, conduits, and connections are designed to be made of ajax or other metal or composition adapted to withstand a temperature of approximately 4,000° Fahrenheit, and a filling of fragmentary refractory retarding material is used that will stand a like temperature.

In use the steam is superheated to a high degree within the primary pipes $p$, but is restricted and confined therein under great pressure, owing to the smallness of the area of the pipes. When it escapes into the larger area of the secondary or decomposing conduits $c$, it expands to fill the annular space therein, thereby absorbing and rendering latent a sufficient amount of heat to render its constituent gases stable with relation to each other. The large amount of heat necessary to accomplish this result is afforded by the highly and uniformly heated refractory retarding-surfaces within the conduit, in which the heat at the center of the width of annular passage is as great as at the sides of the conduit exposed to direct contact with the products of combustion. Thus there is no central line of lesser resistance afforded to the superheated steam or gaseous constituents, and the latter leave the decomposing-conduits in the most favorable condition for effecting chemical combinations or reactions, as in the manufacture of gas from hydrocarbons, &c.

It is obvious that since the main object of the use of the annular secondary conduits is to afford an increased area for the expansion of the superheated steam without increasing laterally the width of passage (exposed on both sides to the heat of the products of combustion) the concentric arrangement of primary pipes and secondary conduits herein described may be dispensed with and the primary and secondary passages arranged in separate groups in the furnace with like result, but at the sacrifice of economy in space, so that I do not confine myself strictly to the identical arrangement of parts shown. It is also obvious that the annular conduits may be used alone for superheating and decomposing steam, if desired, since they afford a maximum of heating area and surface with a minimum width of passage.

What I claim as my invention, and desire to secure by Letters Patent, is—

1. The combination with a furnace, of a superheater consisting of a series of annular conduits connected together successively within the furnace, each annular conduit having a central flue for the products of combustion and being also exposed peripherally thereto, the chambers in said series of annular conduits being filled loosely and continuously from end to end with fragmentary refractory retarding material to constitute a single long retort entirely within the furnace for the purpose described.

2. The combination with a furnace, of a superheater consisting of a series of annular conduits connected together successively within the furnace, each annular conduit having a central flue for the products of combustion and being also exposed peripherally thereto, the chambers in said series of annular conduits being less than three inches in width laterally and being filled loosely and continuously from end to end with fragmentary refractory retarding material to constitute a single long narrow-passaged retort entirely within the furnace for the purpose set forth.

3. The combination with a furnace, of a superheater consisting of a primary heating-pipe of small diameter and a secondary annular conduit connected therewith, the lateral width of passage in the said secondary annular conduit being the same as the internal diameter of the primary pipe or approximately so, both the primary pipe and the secondary conduit being filled loosely and continuously from end to end with fragmentary refractory retarding material, the whole constituting a single long narrow-passaged retort entirely within the furnace, for the purpose set forth.

4. The combination with a furnace, of a superheater consisting of a primary heating-pipe of not more than three inches internal diameter and a secondary annular conduit connected therewith, the width of passage in the said secondary annular conduit not exceeding three inches laterally, both the primary pipe and the secondary conduit being filled loosely and continuously from end to end with fragmentary refractory retarding material, the whole constituting a single long narrow-passaged retort entirely within the furnace, for the purpose set forth.

5. The combination with a furnace, of a superheater consisting of a primary heating-pipe of small diameter and a secondary annular conduit connected therewith and arranged concentrically thereto so as to create a flue for the products of combustion between them, the lateral width of passage in the said secondary annular conduit being the same as the internal diameter of the said primary pipe or approximately so, both the primary pipe and the secondary conduit being filled loosely and continuously from end to end with fragmentary refractory retarding material, the whole constituting a single long narrow-passaged retort entirely within the furnace for the purpose set forth.

6. The combination with a furnace, of a superheater consisting of a primary heating-pipe of not more than three inches internal diameter and a secondary annular conduit connected therewith and arranged concentrically thereto so as to create a flue for the products of combustion between them, the lateral width of passage in the said secondary annular conduit being the same as the internal diameter of the said primary pipe or approximately so, both the primary pipe and the secondary conduit being filled with fragmentary refractory retarding material, the whole constituting a single long narrow-passaged retort entirely within the furnace for the purpose set forth.

7. The combination with a furnace, of a steam-superheater consisting of a series of small primary heating-pipes and connections of substantially uniform area in cross-section connected together successively and communicating with and discharging into a secondary series of conduits, consisting of annular chambers connected together successively and each arranged concentric to one of the said primary heating-pipes both of said primary and secondary retort-passages being filled loosely and continuously from end to end with refractory retarding material, and all the pipes and connections being situated entirely within the furnace for the purpose set forth.

8. The combination with a furnace, of a steam-superheater consisting of a series of pipes and connections of small internal diameter connected together successively and communicating with and discharging into a secondary series of annular conduits connected together successively, the width laterally at the passages in said conduits being substantially the same as the internal diameter of the said series of primary pipes, the series of primary pipes and the series of secondary conduits being filled loosely from end to end with fragmentary refractory retarding material the whole constituting a single long narrow-passaged retort entirely within the furnace, for the purpose set forth.

9. The combination with a furnace, of a steam-superheater consisting of a series of pipes and connections not exceeding three inches in internal diameter connected together successively, and communicating with and discharging into a secondary series of annular conduits connected together successively, and not exceeding three inches in internal lateral width, the said series of primary pipes and the said series of secondary annular conduits being filled loosely from end to end with fragmentary refractory retarding material, the whole constituting a single long narrow-passaged retort entirely within the furnace, for the purpose set forth.

10. The combination of a furnace formed with a series of flues for the products of combustion, a series of annular conduits situated in said furnace-flues and connected together successively, and a series of pipes arranged centrally in said annular conduits connected with each successively and discharging into said series of annular conduits, the diameters of the pipes and conduits being such relatively that passages are formed for the products of combustion between the peripheral surfaces of the pipes and the inner concentric surfaces of the conduits and between the peripheral surfaces of the conduits and the opposed surfaces of the furnace-flues, the said pipes and conduits being filled loosely and continuously from end to end with fragmentary refractory resisting material and the whole constituting a single long narrow-passaged retort entirely within the furnace, for the purpose set forth.

CHARLES R. INGHAM.

Witnesses:
  D. W. GARDNER,
  GEO. WM. MIATT.